J. DESCHAMPS.
SKID FOR MOTOR VEHICLES.
APPLICATION FILED MAY 28, 1921.

1,400,478.

Patented Dec. 13, 1921.

J. Deschamps
INVENTOR

BY *Victor J. Evans*
ATTORNEY

WITNESSES

UNITED STATES PATENT OFFICE.

JOSEPH DESCHAMPS, OF CHESTERFIELD, VIRGINIA.

SKID FOR MOTOR-VEHICLES.

1,400,478.      Specification of Letters Patent.      Patented Dec. 13, 1921.

Application filed May 28, 1921. Serial No. 473,518.

*To all whom it may concern:*

Be it known that I, JOSEPH DESCHAMPS, a citizen of the United States, residing at Chesterfield, in the county of Chesterfield and State of Virginia, have invented new and useful Improvements in Skids for Motor-Vehicles, of which the following is a specification.

This invention relates to a skid or extricating device for motor vehicles, and the object is to provide improved means by the use of which a motor car or truck may be driven out of a deep rut in soft earth without the necessity of employing jacks and blocking up the wheels, and without the use of tension chains or the like.

A further object is to provide a strong and durable device of small size and light weight, being preferably formed as a single casting, so that a pair of these devices may be readily carried at all times in any motor car and may be adjusted and effectively used.

A still further object is to provide a channel-like element having cleats on its inner and upper surface and especially designed cleats or blades on its lower surface, whereby the device, upon engagement by the wheels is forced down into the mud at the end on which the weight of the car is first placed, lateral and longitudinal movement being prevented, and all of the lower engaging devices being rendered active when the vehicle has traveled a distance of but very few inches from the starting point.

With the foregoing and other objects and advantages in view, the invention consists in the novel construction and formation of the device, and of the various portions thereof, it being understood that modifications may be made within the scope of the claim without departing from the spirit of the invention.

Figure 1:
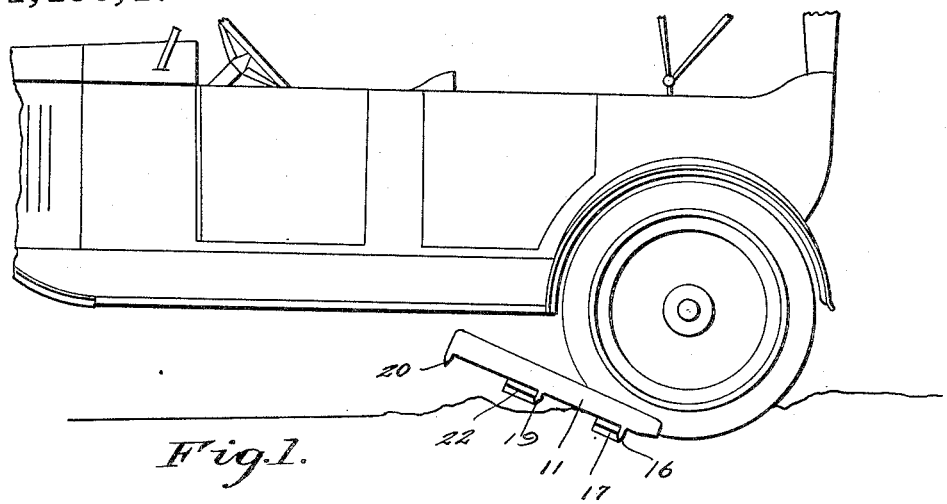
Figure 2:
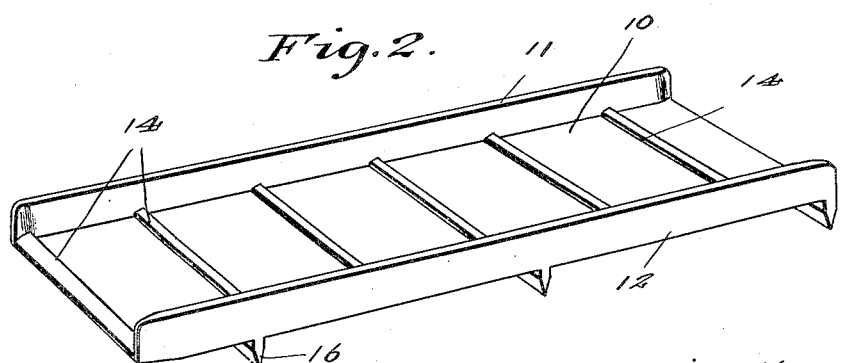
Figure 3:
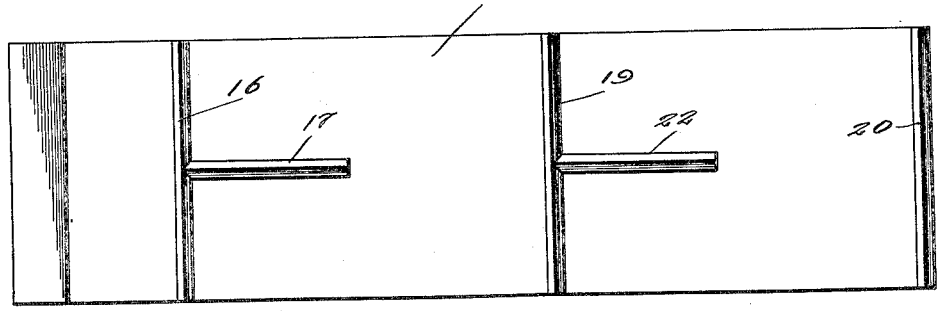
Figure 4:
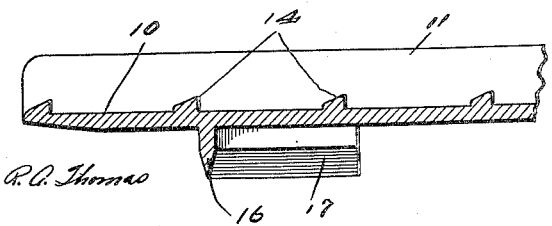

In the drawings, Figure 1 is a view of the device in side elevation, in operative position, a portion of a motor car being shown; Fig. 2 is a perspective view of the skid; Fig. 3 is a bottom plan view; Fig. 4 is a fragmentary view, in longitudinal section.

The device is of suitable size and weight, especial attention being directed to the fact that a length of twenty-seven inches is sufficient under most conditions.

The bottom of the channel element is designated 10 and the sides thereof 11 and 12. Within the channel and on the upper surface of the bottom, cleats 14 are spaced apart at suitable intervals, one of the cleats being very close to the entrance portion, so that it may be engaged by the wheel when the skid is pushed into position for use.

That end of the bottom immediately below the cleats just mentioned is beveled or tapered as shown at 10, in order to facilitate the operation of placing the device in position. A lower engaging device or blade designated 16 is located at about the position shown and extends in a transverse direction. This blade is thinner toward the lower edge and may readily be forced into the ground for preventing longitudinal movement of the channel element.

The next blade designated 17 extends longitudinally and may be of about the same cross section as the blade 16, having one end in contact with the surface of the blade 16, or in fact being formed integrally therewith, assuming that the entire device is made as a single casting.

Other transverse blades 19 and 20 are located as shown, the latter being at the forward ends and the former being in an intermediate position. A second longitudinal blade is shown at 22, and it is obvious that the number of blades is immaterial so that a sufficient number is provided and that these elements extend both longitudinally and transversely, in order to prevent movement in both directions.

The device being placed in position in the manner above indicated, the wheel immediately engages the first cleat at the end and tractive effort is realized at the beginning of the operation, the wheel advancing through the channel and engaging the successive cleats 14 of course serve to press the lower transverse and longitudinal blades into the earth, thereby providing positive engagement.

Low cost, durability, facility in application, and effectiveness in use, are among the principal advantages of the device.

What is claimed is:

A skid for a motor vehicle, comprising a channel element having a bottom beveled at one end on the underside thereof, a cleat carried by the upper side of said bottom near the entrance end thereof, additional cleats spaced apart on the upper surface of the bottom, blades extending transversely of the lower surface of the bottom, and additional blades extending longitudinally of the bottom, below the latter and perpendicularly with reference to the remaining blades on the side of the bottom element.

In testimony whereof I affix my signature.

JOSEPH DESCHAMPS.